(12) United States Patent
Kuroda et al.

(10) Patent No.: US 8,133,542 B2
(45) Date of Patent: Mar. 13, 2012

(54) RESIN-COATED METAL PLATE AND DRAWN CANS USING THESE PLATES

(75) Inventors: Akio Kuroda, Yokohama (JP); Takashi Iwai, Yokohama (JP); Kazuhiro Sato, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 12/847,610

(22) Filed: Jul. 30, 2010

(65) Prior Publication Data

US 2010/0296898 A1    Nov. 25, 2010

Related U.S. Application Data

(62) Division of application No. 10/563,008, filed as application No. PCT/JP03/11428 on Sep. 8, 2003, now abandoned.

(51) Int. Cl.
*B05D 3/02* (2006.01)
(52) U.S. Cl. .................. 427/385.5; 427/388.1; 427/409
(58) Field of Classification Search .................. None
See application file for complete search history.

(56) References Cited

U.S. PATENT DOCUMENTS

| | | | |
|---|---|---|---|
| 4,318,882 A | | 3/1982 | Agrawal et al. |
| 5,141,779 A | * | 8/1992 | Nield et al. ................ 427/385.5 |
| 6,869,496 B1 | * | 3/2005 | Kollaja et al. ................ 156/277 |
| 7,629,038 B1 | * | 12/2009 | Nishida et al. ................ 428/172 |
| 2008/0241448 A1 | * | 10/2008 | Sato et al. .................... 428/35.8 |

FOREIGN PATENT DOCUMENTS

| | | |
|---|---|---|
| JP | 2-501644 | 6/1990 |
| JP | 03-057514 | 3/1991 |
| JP | 05-269920 | 10/1993 |
| JP | 07-195618 | 8/1995 |
| JP | 10-315389 | 12/1998 |
| JP | 2000-153576 | 6/2000 |
| JP | 2000153843 | 6/2000 |
| JP | 2004-058539 | 2/2004 |
| WO | WO94/14552 * | 7/1994 |

* cited by examiner

*Primary Examiner* — Erma Cameron
(74) *Attorney, Agent, or Firm* — Browdy and Neimark, PLLC

(57) ABSTRACT

The present invention offers resin-coated metal plates and methods of making, in which the resin-coated metal plates prevent wicket scars from occurring during processes of varnish, print and dry, and there are few scars on the resin-coated surface, the inner surface side of the can and that have superior corrosion resistance and workability, and drawn cans using these metal plates. Therefore, resin film that is applied to the metal plates, is comprised of two layers of a crystallized saturated polyester resin layer [A] and a layer composed of resin [B] that is comprised of saturated polyester resin (i) and ionomer resin (ii), wherein the layer composed of resin [B] is laminated on the above-mentioned metal plate to tightly contact with it, and on the polar surface of the saturated polyester resin layer that is crystallized [A] a highly crystallized layer (X) is formed. A drawn can is formed using the resin-coated metal plate.

4 Claims, 1 Drawing Sheet

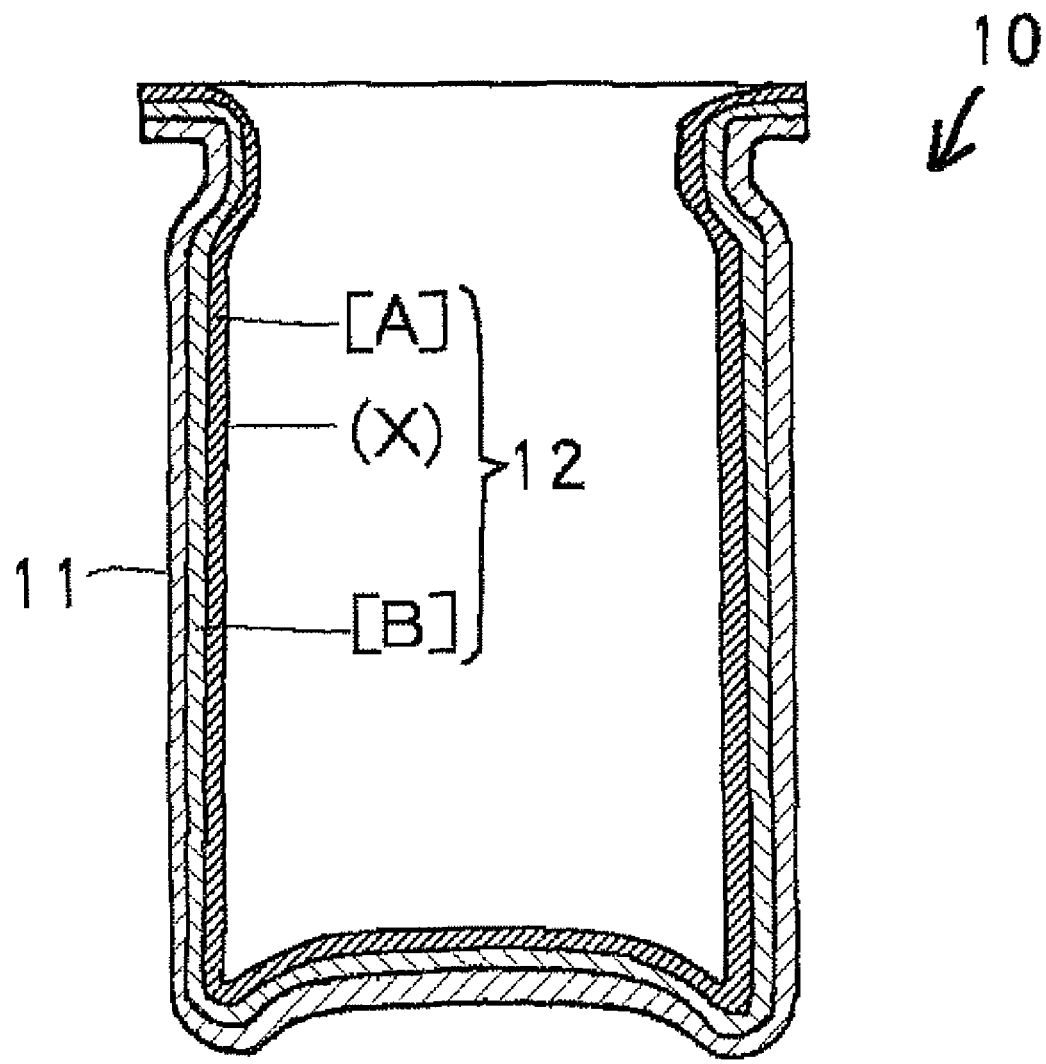

RESIN-COATED METAL PLATE AND DRAWN CANS USING THESE PLATES

CROSS-REFERENCE TO RELATED APPLICATIONS

The present application is a Divisional of prior application Ser. No. 10/563,008, filed Dec. 7, 2006, now abandoned, which is a §371 National Stage application of PCT/JP2003/011428, filed Sep. 8, 2003. The entire contents of both applications are incorporated herein by reference.

BACKGROUND OF THE INVENTION

1. Field of the Invention

The present invention relates to a resin-coated metal plate and drawn cans using these plates. More specifically, the invention relates to resin-coated metal that has been laminated with special layers of resin film, and drawn cans using these resin-coated metal plates.

2. Prior Art

Conventionally, drawn cans have widely been used, which have been processed by drawing metal plates such as tin-plated steel or aluminum plates (hereinafter "DR can").

For these kinds of DR cans, the inner surface side of the can has been formed with resin-film layers, in order to prevent degradation in flavor and a deterioration of the contents due to metal elution from the metal plate, and the occurrence of pinholes and so forth.

The above-mentioned resin film, together with being required to have superior workability in conformity with draw-processing, it is also required to have superior adherence so as to prevent peeling from the steel plate. Moreover, this resin film is required to have superior shock-resistance, in order to tolerate the shock of stamping, canning and transport.

In order to improve workability and adherence, the resin film should not have a very high degree of hardness. If the degree of hardness is too high, it will be low in workability and adherence, and because it is also too brittle it will be low in shock-resistance as well.

On the other hand, although print and varnish are applied to the outer surface side of the can. After printing and varnishing, it undergoes a drying process in a baking oven and so forth. Therefore, at the inner surface side of the can, where varnishing and printing have not been applied, cases can occur where there is scarring (wicket scars) at the holding of the plate of the can.

In order to prevent these wicket scars from becoming the starting point of corrosion during the filling of the contents, due the negative influence they have on the corrosion resistance of the can body, these cans are formed using a resin-coated metal plate. In addition to becoming the starting point of corrosion, these wicket scars also affect the flavor of the contents in beverages and so forth (flavor degradation).

One problem with wicket scarring in this kind of can body, where the corrosion resistance and flavor and so forth have been degraded, is that the softer the resin film is the easier it is for this to occur.

SUMMARY OF THE INVENTION

The present invention is conducted focusing on the above-mentioned problems of the conventional arts and the object of the invention is to provide resin-coated metal plates that prevent the wicket scars from occurring in the processes of varnishing, painting and drying. Furthermore, the object is to provide resin-coated metal plates that are laminated resin-film layers which have characteristics such as superior workability, corrosion-resistance, adherence of resin, shock-resistance and so forth.

Moreover, it is also the object of the invention to provide drawn cans that use these resin-coated metal plates.

Resin-coated metal plates are, according to claim 1, comprised of metal plates, and resin film that is applied to the one surface side or to both sides of the metal plate, wherein this resin film is comprised of two layers of,

[A] a crystallized saturated polyester resin layer that is induced from dicarboxylic acid and dihydroxy compounds and, within the components of dicarboxylic acid are terephthalic acid and isophthalic acid, or only terephthalic acid, and

[B] a layer composed of resin that is comprised of (i) saturated polyester resin and (ii) ionomer resin, the layer composed of resin [B] is laminated on the above-mentioned metal plate to tightly contact with it, a highly crystallized layer (X) is formed on the polar surface of the crystallized saturated polyester resin layer [A].

These resin-coated metal plates are desired that the highly crystallized layer (X) is 10-60%.

The drawn cans of the present invention are formed by drawing or re-drawing of the resin-coated metal plates to have the highly crystallized layer (X) becoming the inner surface side of the can.

BRIEF DESCRIPTION OF THE DRAWINGS

FIG. 1 is a cross-section of a drawn can of the present invention.

DETAILED DESCRIPTION OF THE INVENTION

The following is the explanation of the embodiment of the resin-coated metal plates and the drawn cans using these plates of the present invention.

The resin-coated metal plates of the present invention are comprised of metal plates and resin film that is applied, at least, to the inner surface of the metal plate.

In the present invention, as a metal plate conventionally well-known metal to be generally used for producing cans is used. For example, a tin-plated steel plate (tin plate) wherein Sn (tin) is applied to the surface by a known method, a tin-free steel (TFS) plate, a steel plate with Ni being applied to, a steel plate with Zn being applied to or an aluminum plate and so forth.

It is desirable that this metal plate normally has a thickness of 0.01-0.5 mm, and preferably it has a thickness of 0.1-0.2 mm.

At least on the one surface, which is the inner surface of the can of this metal plate or on both surfaces of the metal plate, two-layer resin film that is comprised of two layers of a crystallized saturated polyester resin layer [A] and a layer composed of resin [B] that is comprised of saturated polyester resin (i) and ionomer resin (ii).

The reason why to have two layers of resin film is to have both characteristics of enough adherence with the metal plate and corrosion-resistance against the contents to be packaged inside of the can. That is, as for the resin film contacted with the metal plate, wherein the non-crystallized layer composed of resin [B] ensures adherence during working cans, and for the resin film contacted with the contents, wherein the crystallized saturated polyester resin layer [A] which contains crystallization ensures corrosion-resistance against the contents of the can.

The crystallized saturated polyester resin layer [A] used in the present invention, is formed from constitutional unit that is induced from dicarboxylic acid and dihydroxy compound.

The compositions of the dicarboxylic acid to form the crystallized saturated polyester resin layer [A] are induced from particular two kinds or one kind of dicarboxylic acid. That is, the compositions of dicarboxylic acid are terephthalic acid and isophthalic acid, or only terephthalic acid.

Moreover, as the compositions of dihydroxy compounds to form the crystallized saturated polyester resin layer [A], for example, there may be aliphatic dihydroxy compounds such as ethylene glycol, trimethylene glycol (propylene glycol), tetramethylene glycol, pentamethylene glycol, diethylene glycol, triethylene glycol and so forth.

The above mentioned crystallized saturated polyester resin layer [A], could contain a small amount of constitutional unit that is induced from polyfunctional compounds such astrimestic acid, pyromellitic acid, trimethylolethance, trimethylolpropane, trimethylolmethane, pentaerythritol and so forth as far as it deteriorates the object of the invention.

As for the highly crystallized layer (X) on the polar surface of the crystallized saturated polyester resin layer [A], concretely, it is desirable that the degree of crystallization calculated by strength-ratio of 973 cm.1 and 795 cm.1 of IR spectrum obtained by the ATR method using 45° KRS.5 crystal, is 10-60%, or preferably, 10-40%. If the degree of crystallization is less than 10%, it is difficult to have superior corrosion-resistance against the contents that have a high degree of corrosion. On the other hand, if the degree of crystallization is over 60%, it is not very desirable since that decreases workability.

Further, although the thickness of the polar surface where the highly crystallized layer (X) is form is not limited in the present prevention, it is desirable that it should be formed at the degree of at least of not less than 2% of the thickness of the crystallized saturated polyester resin layer [A]. If the thickness is less than 2%, it is difficult to have superior corrosion-resistance against the contents that have a high degree of corrosion.

In the present invention, saturated polyester resin (i) to be used to form a layer composed of resin [B] is formed from constitutional unit that is induced from dicarboxylic acid and dihydroxy compounds.

As for the saturated polyester resin (i), the compositions of dicarboxylic acid are comprised of terephthalic acid or its ester derivative (for instance, lower alkyl ester, phenyl ester and so forth), the compositions of dihydroxy compounds are comprised of ethylene glycol or its ester plastic derivative (for instance, monocarboxylic acid ester ethylene oxide and so forth).

This saturated polyester resin (i) may contain constitutional unit that is induced from other kinds of dicarboxylic acid and/or other kinds of dihydroxy compounds in the amount of equal or less than 40 mol %. As examples of dicarboxylic acids except for terephthalic acid, there may be aromatic dicarboxylic acids such as phthalic acid, isophthalic acid, naphthalene dicarboxylic acid, diphenyl dicarboxylic acid, and diphenxyethane dicarboxylic acid; aliphatic dicarboxylic acid such as adipic acid, sobacic acid, azelaic acid, and decane dicarboxylic acid; alicyclic acid such as cyclohexane dicarboxylic acid, and so forth. These dicarboxylic acids except for terephthalic acid may be used as its ester derivatives.

Furthermore, as examples of dihydroxy compounds except for ethylene glycol, there may be fumaric glycol such as propylene glycol, tetramethylene glycol, neopentyl glycol, hexamethylene glycol, dodecamethylene glycol, diethylene glycol, triethylene glycol, tetraethylene glycol and polyethylene glycol; alicyclic glycol such as cyclohexane dimethanol; aromatic glycol such as varieties of bisphenol, hydroquinone, 2,2-bis(4-.-hydroxyethoxy phenyl) propane, and so forth. These dihydroxy compounds may be used as its ester derivatives.

Moreover, saturated polyester (i) used in the present invention could contain a small amount of constitutional unit, for instance in the amount of equal or less than 2 mol %, that is induced from polyfunctional compounds such astrimestic acid, pyromellitic acid, trimethylolethance, trimethylolpropane, trimethylolmethane, pentaerythritol and so forth.

In the present invention, as for ionomer resin (ii) to be used to form a layer composed of resin [B], the known ionomer resin has widely been used, that is an ionized salt wherein part or a whole of carboxyl base in the copolymerization of ethylene and $\alpha,\beta$-unsaturated carboxylic acid has been neutralized with metal positive ion.

As examples of this $\alpha,\beta$-unsaturated carboxylic acid, there may be unsaturated carboxylic acids with carbon number 3-8, such as acrylic acid, methacrylic acid, maleic acid, itaconic acid, anhydrous maleic acid, maleic acid monomethylester, and so forth.

As examples of this metal positive ion that neutralizes carboxyl base in the copolymerization of ethylene and unsaturated carboxylic acid, there may be metal positive ions of 1-2 value, such as Na+, K+, Li+, Zn+, Zn++, Mg++, Ca++, Co++, Ni++, Mn++, Pb++, Cu++ and so forth. Moreover, part of the rest of carboxyl base that has not been neutralized with metal positive ion may be esterized with lower alcohol.

As examples of this ionomer resin (ii), as mentioned above, there may be ionomer resin wherein part or a whole of carboxyl base in the copolymerization of ethylene and unsaturated carboxylic acids such as acrylic acid and metacrylic acid, or the copolymerization of ethylene and unsaturated carboxylic acids such as maleic acid and itaconic acid, has been neutralized with metal positive ion has been with metal positive ions such as sodium, potassium, lithium, zinc, magnesium and calcium.

In these examples, it is desirable that 30-70% of carboxyl base in the copolymerization ethylene and acrylic acid or metacrylic acid has been neutralized with metal such as Na. And also, it may be usable that the carboxyl base that has been neutralized with metal such as Na is blended with the carboxyl base that has not been neutralized. As for this ionomer resin, goods on the market may be used such as "Himilian (Surlyn of American DuPont company)" (name of product: produced by DuPont-Mitsui Polychemicals co., ltd.).

In the present invention, the resin film laminated on metal plates is comprised of two layers of a crystallized saturated polyester resin layer [A] and a layer composed of resin [B] mentioned above, and a layer composed of resin [B] is laminated on the above-mentioned metal plate to tightly contact with it. The thickness of resin layers that have been laminated in this way, is usually 5-500 μm, a total of two layers, preferably 10-100 μm, and even more preferably 20-60 μm.

Moreover, as for the ratio of the thickness of two layers of the crystallized saturated polyester resin layer [A] and the layer composed of resin [B], layer [A]: layer [B]=2:1-1:9 is desirable.

If layer [A]/layer [B] is greater than 2, it is not preferable because the shock-resistance might decrease. On the other hand, if layer [A]/layer [B] is less than 1/9, it is not preferable because it might become difficult to laminate film on metal plates with the same thickness of layer continuously and the cans that are obtained might cause pinholes.

The above-mentioned resin-coated metal plates in the present invention is for instance, produced in the following methods (1)-(3).

(1) The crystallized saturated polyester resin layer [A] and the layer composed of resin [B], prepared as above mentioned, are extruded at the same time through a two-layer T-die to contact the resin layer [B] with a metal plate on the metal plate.

(2) At first, the film is formed from The crystallized saturated polyester resin layer [A] and the layer composed of resin [B] and this film is attached to the metal plate to have the layer composed of resin [B] contacted the metal plate.

(3) On the metal plate the layer composed of resin [B] is formed and then the crystallized saturated polyester resin layer [A] is formed on the layer composed of resin [B].

As mentioned above, when resin layer is coated on the metal plate, the resin film that is coated on the metal plate through an extruder in the condition of being melt is desired to be cooled down immediately. This the resin film coated on the metal plate through an extruder in the condition of being melt is desired to be substantially unoriented and uncrystallized.

Although it is not usually necessary, when resin layer is coated on the metal plate, an adhesive agent may be applied to between the metal plate and the layer composed of resin [B], furthermore between the crystallized saturated polyester resin layer [A] and the layer composed of resin [B] to connect with each other tightly when it is necessary.

As for the adhesive agent, an adhesive agent that will harden with heat is desirable. For example, epoxy resin that contains a large amount of phenoxy resin as main agent, polyester resin, urethane type resin, acryl resin and so on. As epoxy resin, denatured epoxy resin can be used such as polyester denatured epoxy resin, and as polyester resin, denatured polyester resin can be used as well.

The resin as the main agent can be used as itself or with other agents. Further, as good examples of hardening agent used and blended with these main agents, there may be anhydride, aminoplast, phenol resin, urethane type hardening agents and so forth, and at least one kind of them can be used.

As examples of resin composition that will harden with heat using the main agents and hardening agents, there may be resin composition that contains epoxy resin and anhydride, or resin composition that contains phenol resin or polyester resin, and aminoplast or urethane type hardening agents.

In the present invention, on the polar surface of the above-mentioned the crystallized saturated polyester resin layer [A], a highly crystallized layer is formed. By being formed a highly crystallized layer on the polar surface of the above-mentioned crystallized saturated polyester resin layer [A], the mechanic strength is increased on the surface of the crystallized saturated polyester resin layer [A]. That is why cans could prevent the occurrence of scarring on the resin-coated surface of the inner surface side of the can while they go through the processes of the varnishing and printing devise and the baking oven for drying.

The highly crystallized layer (X) is formed, after resin-coated metal plates are produced in either of the above-mentioned (1)-(3) methods, by maintaining the resin-coated metal plates at a designated temperature for a designated time. That is, for instance, the resin-coated metal plates are cut in a designated size, then by applying print on the resin-coated surface and maintaining them in the baking oven at a designated temperature for a designated time, the highly crystallized layer (X) is formed on the polar surface of the crystallized saturated polyester resin layer [A]. By operating this heat treatment, as a result, resin-coated metal plates can be obtained that has a high degree of mechanic strength on the polar surface and have superior adherence to metal plates.

It is desirable that the temperature for treatment to form the highly crystallized layer (X) is equal or more than Tg+30° C. and equal or less than Tm. 10° C. of the crystallized saturated polyester resin layer [A], more specifically, it is 150° C.-200° C. If it is less than 150° C., it is difficult to obtain the highly crystallized layer (X) that has a degree of crystallization is equal or more than 10% with a designated thickness, and if it is over 200° C., it is not preferable because there is a danger of the crystallized saturated polyester resin layer [A] being deteriorated by heat.

To form the highly crystallized layer (X), the desirable time for maintaining in the oven is 10 seconds to 30 minutes. More preferably, 1 minute to 30 minutes is desirable. If it is less than 10 seconds, the highly crystallized layer (X) that has a degree of crystallization of larger than 10%, and if it is over 30 minutes, it is not desirable because there is a danger of the crystallized saturated polyester resin layer [A] being deteriorated by heat.

As mentioned above, the resin-coated metal plates of the present invention are comprised of metal plates, a crystallized saturated polyester resin layer [A] and a layer composed of resin [B] having the above mentioned ration of thickness of film, wherein the layer composed of resin [B] is laminated on the metal plate to tightly contact with each other, and a highly crystallized layer (X) is formed on the polar surface of the crystallized saturated polyester resin layer [A].

Therefore, the resin-coated metal plates of the present invention have superior shock-resistance and superior workability, especially for drawing, and when they are formed, they are uniformly worked without causing pinholes in film. Moreover, this resin film has superior adherence to the metal plate and superior workability followed by forming, thereby to obtain cans that have the superior outside appearance.

The drawn can of the present invention 10 is, as shown in FIG. 1 of its cross section, formed drawing or re-drawing the resin-coated metal plate 11. In this case where the resin-coated metal plate that is applied resin film 12 to the only one surface side of the metal plate 11, it is drawn to have the surface of resin film as the inner surface side of the can.

Further, the resin film 12 is affixed on the metal plate 11 and formed a layer composed of resin [B], and as the upper layer of that a crystallized saturated polyester resin layer [A] is formed. Moreover, a highly crystallized layer (X) is formed on the polar surface of the crystallized saturated polyester resin layer [A].

Furthermore, when drawn cans are formed from the above-mentioned resin-coated metal plates, if the resin-coated metal plates that have resin film on both surface sides of the plates are used drawn cans can be obtained that are coated with resin not only on the inner surface side of the can but also on the outer surface side of the can. They can omit the process of varnish on the outer surface side of the can that is usually operated after forming cans, and it is preferable because there is no problem of solvents scattering during varnishing and it can greatly reduce the equipment of producing cans.

As for methods of producing drawn cans (DR cans), various known methods can be adopted. That is the most general method, wherein by punching resin-coated metal plates into a disk-shape, and drawing with a punch and a die cylindrical cans with the bottom are formed, then the cylindrical cans with the bottom are subject to trimming, flange working, necking in the can wall, and forming a bead portion and so forth, and the bottom is subject to doming work and so forth thereby to obtain drawn cans.

EXAMPLES

The invention will now be described by way of Examples and Comparative Examples, however, these examples are not intended to limit the scope of the present invention in any sense.

As shown in Table 1, crystallized saturation-polyester resin [A] and resin compositions [B] that contains compositions as shown in Table 1, saturated polyester resin (i) and ionomer resin (ii) (name of product "Himilian (Surlyn of American DuPont company)": produced by DuPont-Mitsui Polychemicals co., ltd.) were laminated on the one surface side of TFS (the thickness of the plate is 0.18 mm) by using two kinds of two-layer extrusion T-dies to have the ratio of thickness of film as shown in Table 1, have the layer [B] tightly contacted with the TFS steel plate and have a thickness of film, a total of 25 m. The TFS steel plate used was heated and after being coated resin by a T-die, within 10 seconds it was immediately cooled down at the temperature of less than 100. This resin-coated metal plate was cut in a designated length, and then cut in the size of 759 m×871 mm. Print was applied on the outer surface of the can and as shown in Table 2, it was heat-treated for 1-30 minutes in a baking oven at 150-200, and then a highly crystallized layer (X) was formed on the inner surface side of the can.

TABLE 1

| | saturated polyester resin of each layer | ... ionomer resin (4) | (.) degree of crystallization |
|---|---|---|---|
| Ex. 1 | ... isophthalic acid 5 mol % (1) <br> ... isophthalic acid 16 mol % (2) | 17 | 15% |
| Ex. 2 | ... isophthalic acid 5 mol % <br> ... isophthalic acid 7.7 mol % | 15 | 30% |
| Ex. 3 | ... terephthalic acid 100 mol % <br> ... isophthalic acid 6.9 mol % | 17 | 20% |
| Ex. 4 | ... isophthalic acid 10 mol % <br> ... isophthalic acid 10 mol % | 17 | 50% |
| Ex. 5 | ... isophthalic acid 10 mol % <br> ... isophthalic acid 7.7 mol % | 15 | 20% |
| Ex. 6 | ... isophthalic acid 10 mol % <br> ... isophthalic acid 6.9 mol % | 17 | 25% |
| Ex. 7 | ... isophthalic acid 10 mol % <br> ... CHDM (3) 30 mol % | 12 | 40% |
| Ex. 8 | ... isophthalic acid 10 mol % <br> ... isophthalic acid 10 mol % | 15 (5) | 60% |
| Comp. Ex. 1 | ... isophthalic acid 5 mol % (1) <br> ... isophthalic acid 16 mol % (2) | 17 | 0% |
| Comp. Ex. 2 | ... isophthalic acid 10 mol % <br> ... CHDM (3) 30 mol % | 12 | 5% |

(1) copolymerized polyester resin [A]: the composition of dicarboxylic acid is 100 mol %. The compositions of dicarboxylic acid except for isophthalic acid is terephthalic acid.
(2) copolymerized polyester resin (a): the composition of dicarboxylic acid is 100 mol %. The compositions of dicarboxylic acid expect for isophthalic acid is terephthalic acid.
(3) copolymerized polyester resin (a): the dihydroxy composition is 100 mol %. The dihydroxy compositions except for CHDM (cyclohexane dimethanol) is ethylene glycol.
(4) resin composition [B]. ionomer resin and saturated polyester resin is a total of 100 w/t part.
(5) ionomer: Himilan1707 (Name of product: produced by Mitsui Dupon Polychemical Company)

TABLE 2

| | condition of oven. temperature × maintaining time. |
|---|---|
| Ex. 1 | 190. × 10 min. |
| Ex. 2 | 150. × 30 min. |
| Ex. 3 | 200. × 1 min. |
| Ex. 4 | 200. × 10 min. |
| Ex. 5 | 180. × 15 min. |
| Ex. 6 | 160. × 25 min. |

TABLE 2-continued

| | condition of oven. temperature × maintaining time. |
|---|---|
| Ex. 7 | 170. × 25 min. |
| Ex. 8 | 160. × 20 min. |
| Comp. Ex. 1 | 100. × 10 min. |
| Comp. Ex. 2 | 150. × 5 sec. |

The resin-coated metal plates obtained in this way were, so as to have the resin-coated surface that have a highly crystallized layer become the inner surface side of the can, drawn to produce drawn cans. Moreover, at the other side of edge portion a can lid that was laminated with polyethylene telephthalate on the inner surface side was forced on by necking twice to obtain beverage cans.

The resin-coated metal plates were gone through a baking oven and it was observed with the naked eye whether there would be wicket scars on the metal plate or not. Furthermore, using the resin-coated metal plates of the Examples cans were produced and filled them with contents. After the cans were preserved for one month, they were observed with the naked eye about the flavor and the condition of corrosion on the inner surface side of the can (When they are corroded, whitened resin is found). The results are shown in Table 3.

TABLE 3

| | condition of highly crystallized layer [X] after going through oven | flavor of contents | corrosion resistance in inner surface of can |
|---|---|---|---|
| Ex. 1 | without wicket scars | good | good |
| Ex. 2 | without wicket scars | good | good |
| Ex. 3 | without wicket scars | good | good |
| Ex. 4 | without wicket scars | good | good |
| Ex. 5 | without wicket scars | good | good |
| Ex. 6 | without wicket scars | good | good |
| Ex. 7 | without wicket scars | good | good |
| Ex. 8 | without wicket scars | good | good |
| Comp. Ex. 1 | with wicket scars | not good | not good |
| Comp. Ex. 2 | with wicket scars | not good | not good |

As shown in the cases of Examples 1-8 of Table 3, the resin-coated metal plates of the present invention, there were not found to be occurrence of wicket scars, and the flavor of the contents and corrosion resistance were superior. On the other hand, in the cases of Comparative Examples 1 and 2, since there were found to be occurrence of wicket scars, the flavor of the contents and corrosion resistance were deteriorated.

The resin-coated metal plates of the present invention prevent wicket scars from occurring, and there are few scars on the resin-coated surface, the inner surface side of the can, during processes of varnish, print and dry. They make possible to produce superior drawn cans that have superior corrosion resistance, workability and so forth,

What is claimed is:
1. A method for making a resin-coated metal plate for a drawn can, said method comprising the steps of:
   step (a) applying a layer [A] and a layer [B] either together or separately on at least one surface of a metal plate to form a resin-coated metal plate, so that the layer [B] is laminated on the metal plate to form a tight contact with the metal plate, in which the layer [A] and the layer [B] are substantially unoriented and uncrystallized before heating of step (b), wherein the layer [A] is a saturated polyester resin produced from dicarboxylic acid and dihydroxy compounds, in which the components of dicarboxylic acid are terephthalic acid and isophthalic acid, or only terephthalic acid, and the layer [B] comprises a saturated polyester resin and an ionomer resin; and step (b) heating the resin-coated metal plate while the resin-coated metal plate is held with a wicket to form a highly crystallized layer (X) on a surface of the layer [A], so that the highly crystallized layer (X) is resistant to corrosion, to thereby form the resin-coated metal plate for a drawn can, wherein the ratio of the thickness of the layer [A] to the layer [B] is in range of 2:1 to 1:9, wherein the heating of step (b) is performed at a temperature of 150 to 200° C. for 1 to 30 minutes, wherein the highly crystallized layer (X) has a degree of crystallization that is 10-60%, and wherein the highly crystallized layer (X) is at least 2% of thickness of the layer [A].

2. The method according to claim 1, further comprising: applying a print to a surface that is an outer side of a drawn can of the resin-coated metal plate before the heating of step (b).

3. The method according to claim 1, wherein the thickness of the resin layer comprising the layer [A] and the layer [B] is 5-500 μm.

4. A method of manufacturing a drawn can, comprising drawing the resin-coated metal plate of claim 1 to form the drawn can so that the highly crystallized layer (X) is on an inner surface side of the drawn can.

* * * * *